United States Patent Office 3,177,187
Patented Apr. 6, 1965

3,177,187
SYM - TETRAFLUORODICHLOROISOPROPYL
ACRYLATE COMPOUNDS AND POLYMERS
THEREOF
Jerome Hollander and Cyril Woolf, Morristown, N.J.,
assignors to Allied Chemical Corporation, New York,
N.Y., a corporation of New York
No Drawing. Filed Oct. 28, 1963, Ser. No. 319,590
14 Claims. (Cl. 260—89.5)

This invention relates to new fluorochlorinated acrylic compounds, and more particularly, to new sym-tetrafluorodichloroisopropyl acrylate and sym-tetrafluorodichloroisopropyl methacrylate, their polymers and processes for their preparation.

Polymers prepared from the monoesters of acrylic acid and its derivatives have been long recognized as thermoplastic materials whose utility is both wide and varied. Numerous as these applications may be, however, acrylic polymers in general have been limited to those environments which are exposed to limited thermal conditions since they inherently possess a degree of thermal instability. Moreover, these acrylic materials have frequently been found to support combustion which of course, eliminates their utility from those industrial applications wherein combustible materials may not, of necessity, be employed.

Bittles in U.S. Patent 2,628,958 attempted to obtain more thermally stable acrylic polymers by reacting acrylic acid with a primary fluorinated alcohol followed by polymerization of the resulting monomer but found that acceptable thermal stability was only attained when the straight chain fluorinated alcoholic moiety contained at least 5 carbon atoms. Thus, Bittles required a fluorinated primary alcohol reactant of at least 5 carbon atoms in order to obtain a useful product.

It has now been found that sym-tetrafluorodichloroisopropyl alcohol, although a secondary alcohol comprised of less than 5 carbon atoms when reacted with acrylic acid or methacrylic acid or derivatives thereof produces an intermediate fluorochlorinated monomer which, when converted to its corresponding polymer, possesses outstanding thermal and dimensional stability. Moreover, these fluorochlorinated acrylic polymers derived from sym-tetrafluorodichloroisopropyl alcohol, when utilized as fiber impregnators, exhibit outstanding and unexpected oleophobic and hydrophobic properties as is described in our co-pending U.S. application Serial No. 319,514 filed of even date. In addition, the fluorochlorinated acrylic fiber impregnators exhibit remarkable penetrating and wetting ability and the fiber treated thereby exhibits excellent hand or feel qualities.

Our co-pending U.S. application Serial No. 319,546, filed of even date, discloses and claims sym-hexafluoroisopropyl acrylate and methacrylate compounds, homopolymers derived therefrom and process for their preparation.

Accordingly, it is a principal object of the present invention to provide new sym-tetrafluorodichloroisopropyl acrylate and sym-tetrafluorodichloroisopropyl methacrylate.

It is a further object of the present invention to provide new fluorochlorinated acrylic polymers derived from sym-tetrafluorodichloroisopropyl acrylate and sym-tetrafluorodichloroisopropyl methacrylate.

It is still a further object to provide processes for preparing sym-tetrafluorodichloroisopropyl acrylate and sym-tetrafluorodichloroisopropyl methacrylate and their corresponding acrylic polymers. Other objects and advantages will become apparent from the following description.

In accordance with the present invention, new fluorochlorinated acrylic polymers may be prepared by polymerizing a fluorochlorinated acrylic monomer of the formula

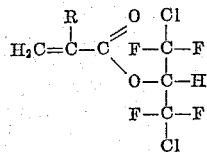

wherein R is a member selected from the group consisting of hydrogen and methyl. The new fluorochlorinated acrylic monomers from which these polymers are derived, may be prepared by reacting sym-tetrafluorodichloroisopropyl alcohol with an acrylic compound. It is to be understood, of course, that the term "acrylic" refers to both acrylic and methacrylic compounds.

Sym-tetrafluorodichloroisopropyl alcohol is a colorless liquid having a boiling point of 110° C. A co-pending U.S. application of Woolf et al., Serial No. 142,784, filed October 4, 1961, describes preparation of sym-tetrafluorodichloroisopropyl alcohol from sym-tetrafluorodichloroisopropyl acetone by hydrogenation.

The fluorochlorinated acrylic monomers of the present invention may be prepared by reacting sym-tetrafluorodichloroisopropyl alcohol with an acrylic compound of the formula

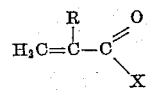

wherein X is a member selected from the group consisting of chlorine, hydroxyl and methoxy and R is a member selected from the group consisting of hydrogen and methyl. It is to be understood of course that the acrylic reactant may also be employed in the form of its acid anhydride. The general formula for such acrylic acid anhydride reactants is:

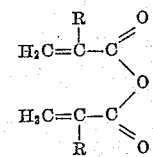

wherein R is hydrogen or methyl. In preferred operation, acrylyl chloride or methacrylyl chloride is employed.

The molar ratio of the reactants is not critical and from about 0.1 mol to about 10 mols sym-tetrafluorodichloroisopropyl alcohol per mol acrylic reactant may be employed to secure the desired reaction product. It is preferred, however, in order to secure highest yields, that a substantially stoichiometric molar ratio of about 1:1 be employed.

A suitable solvent, if desired, may be employed to serve as a diluent and to facilitate reaction at elevated temperatures. Generally speaking, any solvent may be employed provided it is inert under the conditions of reaction and a solvent for the reactants. Illustrative of such solvents are pyridine, quinoline, dimethyl aniline, trifluoroacetic acid, decalin and 1,1,2-trifluoro-1,2,2-trichloroethane.

In order to minimize reaction time a suitable esterification catalyst such as pyridine, quinoline, trifluoroacetic acid, p-toluene sulfonic acid, phosphoric acid and sulfuric acid, may be employed. The amount of catalyst is not critical and may range from about 1.0 to 200%, preferably 5% to 50%, by weight based on the amount of sym-tetrafluorodichloroisopropyl alcohol charged.

In preferred operation, however, pyridine is employed since it acts as both a solvent and a catalyst. Generally, the amount of pyridine employed is about 0.10 to 2.0 parts, preferably 0.5 to 1.5 parts, per part sym-tetrafluorodichloroisopropyl alcohol charged. The reaction temperature may vary over a wide range, i.e. from about room temperature up to the boiling point of the reaction mixture. In preferred operation, a temperature selected from the range of from about room temperature to 100° C. is utilized with a mild agitation of the reaction mixture.

Although acrylyl or methacrylyl chloride is used in preferred operation, the acid or anhydride form of the acrylic reactant may be successfully employed to effect esterification in the presence of a dehydrating and esterification catalyst such as trifluoroacetic acid, sulfuric acid and p-toluene sulfonic acid under the same reaction conditions recited herein.

Recovery and purification of the resulting sym-tetrafluorodichloroisopropyl acrylate or sym-tetrafluorodichloroisopropyl methacrylate may be effected by employing conventional procedures. For example, the entire reaction mixture may be added to a nonsolvent such as water followed by extraction with a solvent such as ether followed by evaporating off of the solvent. Also, distillation of excess reactants and solvent may be employed. Purification procedure may comprise neutralizing acid by-product with a dilute aqueous alkaline solution, water-washing followed by oven-drying.

Sym-tetrafluorodichloroisopropyl acrylate and sym-tetrafluorodichloroisopropyl methacrylate are readily polymerized, even in the absence of a polymerization catalyst by simply heating at moderate temperatures, i.e. room temperature to about 125° C. Since these fluorochlorinated monomers are readily polymerized, it is preferred that they be stored with a polymerization inhibitor such as tert-butyl catechol, or hydroquinone, in order to prevent untimely homopolymerization. Polymerization is accelerated by the addition of a suitable polymerization catalyst as illustrated by organic free radical generators such as benzyl peroxide, lauryl peroxide, acetyl peroxide, succinyl peroxide, azobutyl nitrile or potassium persulfate and/or actinic radiation such as with radiation provided by ultra-violet light.

The following examples are given for the purpose of illustration and not limitation. In the examples parts are by weight.

Example 1

To a cooled vessel containing 28.0 parts of sym-tetrafluorodichloroisopropyl alcohol was added 11.8 parts of acrylyl chloride in a dropwise manner with constant stirring. The resulting reaction mixture was stirred for 0.5 hour at room temperature and then for 5 hours at reflux temperature (140° C.). The reaction mixture containing the resulting sym-tetrafluorodichloroisopropyl acrylate was poured into cold water followed by extraction with ether. The ether extracts were washed with a dilute aqueous solution of sodium carbonate to neutralize any trace amount of by-product hydrogen chloride. The ether was removed by distillation whereupon crude sym-tetrafluorodichloroisopropyl acrylate was obtained as a yellow liquid. Purification was effected by distillation to yield 24.3 parts of sym-tetrafluorodichloroisopropyl acrylate as a clear, colorless liquid. Elemental analysis showed 48.2% fluorine and 2.48% hydrogen which is in excellent agreement with the theoretical values of 48.1% fluorine and 2.55% hydrogen.

6.4 parts of sym-tetrafluorodichloroisopropyl acrylate so prepared were then placed in an evacuated, sealed tube and irradiated with ultra-violet light for 19 hours. The resulting poly-sym-tetrafluorodichloroisopropyl acrylate was a clear, water-white solid which was insoluble in carbon tetrachloride, chloroform and carbon disulfide but soluble in ether and acetone. The poly-sym-tetrafluorodichloroisopropyl acrylate was heated at 200° C. for a period of 24 hours after which it was found to exhibit only a slight amber discoloration.

Example 2

To a cooled vessel containing 150.8 parts of sym-tetrafluorodichloroisopropyl alcohol was added 70.9 parts of methacrylyl chloride in a dropwise manner with constant stirring. The resulting reaction mixture was heated at reflux temperature for a period of 10 hours. The reaction mixture containing sym - tetrafluorodichloroisopropyl methacrylate was poured into cold water followed by extraction with ether. The ether extracts were segregated from the aqueous phase and a dilute aqueous solution of sodium carbonate was added to neutralize any trace amount of hydrogen chloride by-product. Any trace of water was then removed by the addition of anhydrous sodium sulfate. The ether was removed by distillation and crude sym-tetrafluorodichloroisopropyl methacrylate was isolated as a yellow liquid. Purification by distillation yielded 103 parts of sym-tetrafluorodichloroisopropyl methacrylate as a clear colorless liquid. Elemental analysis showed 28.3% fluorine which is in accordance with the theoretical value of 27.5%.

17.5 parts of sym-tetrafluorodichloroisopropyl methacrylate so prepared and 0.02 part of benzoyl peroxide were charged to an evacuated, sealed glass tube. The evacuated tube containing this reaction mixture was kept at 50° C. for a period of 5 days. 16.6 parts of poly-sym-tetrafluorodichloroisopropyl methacrylate as a soft, rubbery solid were obtained and dissolved in acetone. Recovery of poly-sym-tetrafluorodichloroisopropyl methacrylate was effected by the addition of methanol, a nonsolvent, to the acetone solution, whereupon the polymer precipitated out as a finely divided white powder. The polymer was then oven dried at 100° C. under a pressure of 25 pounds/inch$^2$ for a period of 24 hours. 8.1 parts of poly-sym-tetrafluorodichloroisopropyl methacrylate as a white powder were obtained.

Example 3

11.03 parts of sym-tetrafluorodichloroisopropyl methacrylate prepared by the procedure set forth in Example 2 were placed in an evacuated, sealed tube and irradiated with ulra-violet light for 19 hours. The resulting poly-sym-tetrafluorodichloroisopropyl methacrylate was obtained as a clear, water-white, very hard solid.

Example 4

17.5 parts of sym-tetrafluorodichloroisopropyl methacrylate prepared by the procedure set forth in Example 2 and 0.02 part of benzoyl peroxide were placed in an evacuated sealed tube followed by irradiation with ultra-violet light in an icewater bath cooled to 0° C. for a period of 25 hours. Irradiation was then continued at room temperature for an additional period of 17 hours. The resulting poly - sym - tetrafluorodichloroisopropyl methacrylate was recovered as a clear, water-white, hard solid. This solid polymer was then dissolved in acetone and recovered by the addition of the acetone solution to methanol, a nonsolvent. 8.7 parts of poly-sym-tetrafluorodichloroisopropyl methacrylate was recovered as a finely divided white powder followed by drying under vacuum for 24 hours.

This invention may be embodied in other forms or carried out in other ways without departing from the spirit or essential characteristics thereof. The present embodiment is, therefore, to be considered in all respects as illustrative and not restrictive, the scope of the invention being indicated by the appended claims.

We claim:

1. Fluorochlorinated acrylic compounds having the formula

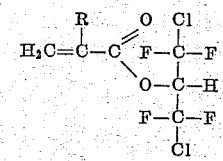

wherein R is a member selected from the group consisting of hydrogen and methyl.

2. Sym-tetrafluorodichloroisopropyl acrylate.

3. Sym-tetrafluorodichloroisopropyl methacrylate.

4. A fluorochlorinated acrylic homopolymer derived from a monomer having a formula

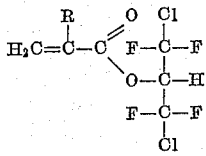

wherein R is a member selected from the group consisting of hydrogen and methyl.

5. A homopolymer in accordance with claim 4 wherein the monomer is sym-tetrafluorodichloroisopropyl acrylate.

6. A homopolymer in accordance with claim 4 wherein the monomer is sym-tetrafluorodichloroisopropyl methacrylate.

7. A process for the preparation of a fluorochlorinated acrylic compound having the formula

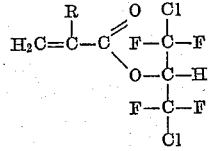

wherein R is a member selected from the group consisting of hydrogen and methyl which comprises admixing sym-tetrafluorodichloroisopropyl alcohol with an acrylic compound of the formula

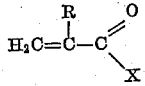

wherein X is a member selected from the group consisting of chlorine, hydroxyl and methoxy and R is a member selected from the group consisting of hydrogen and methyl in a molar ratio of from about 0.1 to 10 mols sym-tetrafluorodichloroisopropyl alcohol per mol acrylic compound at a temperature from about room temperature to the boiling point of the reaction mixture and recovering the resulting fluorochlorinated acrylic compound.

8. A process in accordance with claim 7 wherein the acrylic compound is employed in the form of its acid anhydride.

9. A process in accordance with claim 7 wherein the reaction is conducted in the presence of an inert solvent.

10. A process in accordance with claim 7 wherein an esterification catalyst is employed.

11. A process for the preparation of chlorofluorinated acrylic polymers which comprises homopolymerizing by heating a monomer of the formula

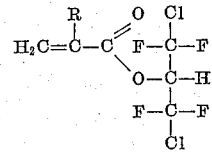

wherein R is a member selected from the group consisting of hydrogen and methyl.

12. A process in accordance with claim 10 wherein a polymerization catalyst is employed.

13. A process in accordance with claim 11 wherein the polymerization catalyst is an organic peroxide.

14. A process in accordance with claim 10 wherein the polymerization is carried out by actinic radiation.

No references cited.

JOSEPH L. SCHOFER, *Primary Examiner.*

DONALD E. CZAJA, *Examiner.*